United States Patent [19]

Ide et al.

[11] Patent Number: 4,729,882

[45] Date of Patent: Mar. 8, 1988

[54] PROCESS FOR CLEANING MERCURY-CONTAINING GASEOUS EMISSIONS

[75] Inventors: Akira Ide, Kanagawa; Tsutomu Shigenaka, Chiba; Masayuki Kokado, Chiba; Shigeru Kondo, Kanagawa, all of Japan

[73] Assignee: Tokyo Metropolitan Environmental Service Corporation, Tokyo, Japan

[21] Appl. No.: 772,236

[22] Filed: Sep. 3, 1985

[30] Foreign Application Priority Data

Mar. 28, 1985 [JP] Japan .................... 60-64589

[51] Int. Cl.$^4$ ............................. B01D 53/34
[52] U.S. Cl. ..................... 423/210; 110/215; 423/240
[58] Field of Search .......... 423/210 R, 210 M, 210 C, 423/491, 240 R, 107; 55/71, 72; 556/118; 110/215

[56] References Cited

U.S. PATENT DOCUMENTS

| 1,938,585 | 12/1933 | Estabrooke | 556/118 |
| 3,054,746 | 9/1962 | Gaden, Jr. et al. | 556/118 |
| 3,764,496 | 10/1973 | Hultman et al. | 423/210 M |
| 3,829,558 | 8/1974 | Banks et al. | 423/488 |
| 3,838,190 | 9/1974 | Birke et al. | 423/210 M |

FOREIGN PATENT DOCUMENTS

| 4291 | 3/1981 | Japan . | |
| 132626 | 7/1985 | Japan | 423/240 |
| 1121845 | 7/1968 | United Kingdom | 423/210 M |
| 331805 | 4/1972 | U.S.S.R. | 423/210 M |

OTHER PUBLICATIONS

A Comprehensive Treatise on Inorganic and Theoretical Chemistry, Mellor, Longmans, Green, and Co. 1946, vol. IV, p. 816.

Primary Examiner—John Doll
Assistant Examiner—Jeffrey Edwin Russel
Attorney, Agent, or Firm—Seidel, Gonda, Goldhammer & Abbott

[57] ABSTRACT

A process for cleaning gaseous emissions containing mercury (Hg) comprises the steps of adding a chlorine-containing material to the mercury-containing gaseous emissions and heating the mixture to convert the mercury into water-soluble mercuric chloride ($HgCl_2$); scrubbing the water-soluble mercuric chloride with wash water and fixing the same as chlorocomplex ion ($HgCl_4^{-2}$) stable in liquid; and thereafter subjecting the washings from the scrubbing step to coagulating sedimentation and thereby fixing and insolubilizing the mercury in the resulting sludge.

6 Claims, 4 Drawing Figures

PROCESS FOR CLEANING MERCURY-CONTAINING GASEOUS EMISSIONS

FIELD OF THE INVENTION

This invention relates to a process for cleaning gaseous emissions containing mercury vapor, and more specifically to a process for cleaning municipal refuse incinerator emissions whereby mercury can be efficiently removed from the emissions.

BACKGROUND ART

Municipal wastes are disposed of by dumping for landfill or by incineration. Since the available landfill space is limited for the growing volume of municipal refuse, most of the latter is of necessity incinerated.

Separating wastes which cannot burn or should not be burned down from burnables prior to incineration is ideal. However, perfect sorting at the time of waste collection is generally impracticable. Consequently, urban wastes frequently contain heavy metals. For example, such heavy metals as cadmium, lead, zinc, copper, manganese, chromium, and mercury are found in the gaseous emissions from municipal incineration plants.

Municipal refuse in recent years has had increasing proportions of mercury-bearing wastes such as dry cells and fluorescent tubes, and it is not infrequent that mercury is detected in municipal incinerator emissions. Unlike other heavy metals, mercury in the emissions does not stick to soot and other particulates. It is therefore not recovered by an electric dust precipitator or the like but is released in the form of mercury vapor into the atmosphere.

Various proposals have hitherto been made for the removal of mercury vapor, or separation of mercury vapor from the gaseous phase. Roughly, they are classified into (1) the use of a strong oxidizing agent, (2) adoption of a solid mercury adsorbent, and (3) a thiourea-copper salt process.

The first approach, the use of a strong oxidizing agent, comprises collecting mercury vapor by means of a mixed solution, e.g., of potassium permanganate and sulfuric acid. The process is utilized in mercury removal from hydrogen gas that results from the electrolysis of salt in soda-manufacturing plants. Since the process depends on the strong oxidizing power of the mixed potassium permanganatesulfuric acid solution for the oxidative absorption of mercury vapor, it presents a number of problems for the maintenance of the equipment materials and also concerning the disposal of the waste liquid that has absorbed mercury. These problems render the adoption of the process extremely difficult or practically impossible for municipal incinerators that emit very large volumes of gases.

For the treatment of mercury in mercury-containing waste liquids, coagulating sedimentation with sodium sulfide is in extensive use. If sodium sulfide for this purpose is added to excess, mercury sulfide once formed could be redissolved in the waste liquid. Also, the addition of an acid for the pH adjustment of the waste liquid would acidify the liquid, thus evolving hydrogen sulfide. The hydrogen sulfide gas produced in this way would not only deteriorate the working environments but also, when released to the atmosphere, would lead to air pollution. The deposit of hydrogen sulfide formed by coagulating sedimentation is instable, as noted above, and has compelled the addition of a sophisticated treatment with active charcoal, chelate resin or the like to the stage that follows the coagulating sedimentation. Along with such a sophisticated treatment it is customary to introduce a large percentage of a coagulant or coagulant aids to the process of coagulating sedimentation in order to prevent the redissolution of the settled hydrogen sulfide. The coagulant or aids thus added eventually increase the quantity of sludge and decrease the mercury recovery efficiency.

The second process using a solid mercury absorbent consists in removing mercury vapor by adsorption from a gaseous phase by the use of an active-charcoal-based solid mercury adsorbent, chelate resin or the like. The process, in use at soda plants, is limited in adsorption capacity and is ordinarily intended for the removal of atomic mercury. It cannot be said effective as a process for mercury removal from municipal incinerator emissions wherein atomic mercury accounts for only 10 to 40% of the mercury content.

In order to achieve the end of mercury removal from gaseous emissions not realized by the first and second approaches, the third process was proposed (Japanese patent application Publication No. 4291/1981). The process for mercury removal is characterized by bringing a gaseous mixture containing mercury vapor into contact with an aqueous solution of thiourea and a copper salt at 50° C. or above to allow the mercury vapor in the gaseous phase to be absorbed for removal by the liquid phase.

The third proposal is not considered desirable, either, since it employs thiourea, a highly toxic and cacinogenic substance according to reports on animal experiments. Moreover, if mercury vapor is to be removed by adsorption from municipal incinerator emissions, a considerably large quantity of thiourea, e.g., more than 5,000 mg/l, will have to be used. Usually, such a large quantity of thiourea would boost the chemical oxygen demand (COD) of the waste liquid. When 5,000 mg of thiourea was added per liter in conformity to the procedure described in the specification of the cited invention, the COD was found to rise to as much as 3,000 to 3,500 mg/l. Waste liquid with COD at such a high level cannot be directly drained off; some extraordinary equipment for oxidative decomposition of the waste liquid is indispensable. Further, an increase in the rate of thigurea addition necessitates a corresponding increase in the amount of the coagulant to be used. It will eventually lead to increased sludge formation and reduced mercury recovery efficiency.

Accordingly it is a principal object of the present invention to provide a technique of mercury removal at very high efficiency from municipal incinerator emissions.

It is another object of the invention to provide a process for cleaning municipal incinerator emissions which is adequately applicable to existing refuse incinerators and which permits removal of mercury vapor without the necessity of special facilities therefor.

Another object of the invention is to provide a process for cleaning municipal incinerator emissions which does not require any extraordinary process step or facility but can utilize ordinary equipment at low maintenance costs.

Still another object of the invention is to provide a process for cleaning municipal incinerator emissions whereby mercury is precipitated in a stable form, the coagulant requirement is decreased, and accordingly the quantity of resulting sludge is reduced to heighten the mercury concentration in the sludge and thereby enchance the efficiency of mercury recovery.

Yet another object of the invention is to provide a process for cleaning municipal incinerator emissions which makes use of conventional equipment for waste gas scrubbing and waste liquid treatment and can remove mercury as well as hydrogen chloride and sulfur oxides from waste gases by absorption into a liquid phase.

A further object of the invention is to provide a process for waste gas cleaning which is satisfactorily applicable to the removal of mercury from not only the emissions out of municipal refuse incinerators but also from other gases containing mercury vapor, such as hydrogen gas generated by the aforementioned electrolysis plants.

The present inventors have made extensive experiments and investigations in an effort to overcome the difficulties of the prior art and achieve the objects enumerated above. As a result, it has now been found that a large quantity of mercury can be most efficiently removed by making effective use of the physical properties of mercury (Hg) present in the gaseous phase; that is, the mercury in the gaseous phase can be converted by an acidic gas into an easily water-soluble mercuric chloride ($HgCl_2$) which then can be fixed by a saline solution or the like to be a chlorocomplex ion ($HgCl_4^{-2}$) stable in liquid, the process itself being readily carried into practice through full utilization of existing equipment. The present invention is predicated upon these findings.

SUMMARY OF THE INVENTION

The objects given above are perfectly realized in accordance with this invention. In brief, the invention resides in a process for cleaning gaseous emissions containing mercury (Hg) characterized by the steps of adding a chlorine-containing material to the mercury-containing gaseous emissions and heating the mixture to convert mercury into water-soluble mercuric chloride ($HgCl_2$); scrubbing the water-soluble mercuric chloride with wash water and fixing the same as chlorocomplex ion ($HgCl_4^{-2}$) stable in liquid; and then subjecting the washings from the scrubbing step to coagulating sedimentation so as to fix and insolubilize the mercury in the resulting sludge.

The process of the invention will be described in more detail below with reference to the accompanying drawings.

BRIEF DESCRIPTION OF THE DRAWINGS

Referring to the accompanying drawings, FIG. 1 illustrates the present invention as embodied in a process for cleaning municipal incinerator emissions. Mercury-containing refuse 1 to be disposed of, e.g., a mass of dry cells, fluorescent tubes, thermometers and the like, is charged into an incinerator 2 of a waste incineration plant. The mass is heated or incinerated together with ordinary burnable wastes. During this, the incinerator 2 is supplied with an acidic gas 4, which is hydrogen chloride, chlorine or the like. Instead of, or in addition to the acidic gas, a chlorine-containing material 6, e.g., plastics, salt or the like that contains chlorine or have chlorine action, may be introduced into the incinerator 2 for combustion with the mercury-containing wastes 1. Needless to say, it will not be necessary to introduce such a chlorine-containing material as the acidic gas 4 or chlorine-containing material 6 into the incinerator 2 when the ordinary burnable wastes already contain such chlorine-containing materials 4 and/or 6.

Figure 2:
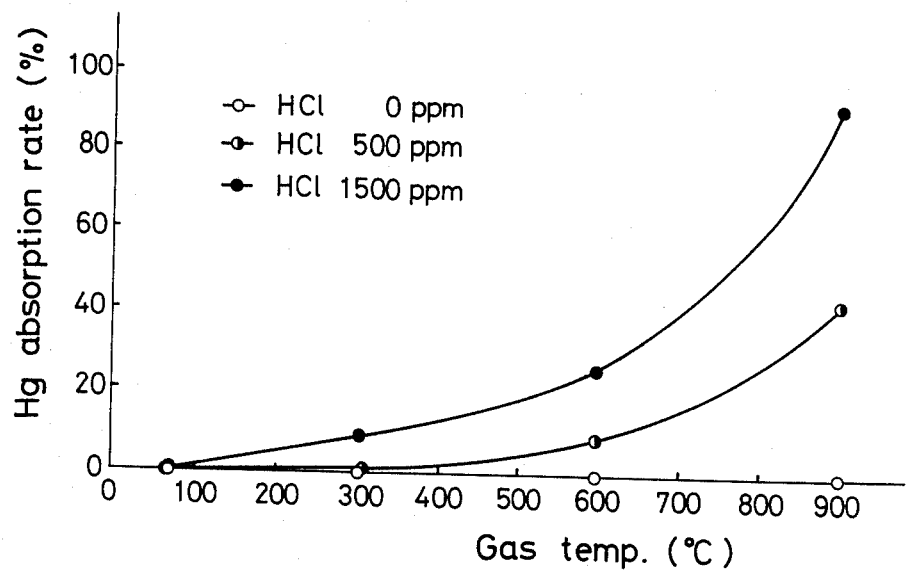
FIG. 2 is a graph showing changes in mercury absorption rate by a (10%) saline solution with the concentration of hydrogen chloride and with the gas temperature.

According to this invention, the interior of the incinerator 2 must be heated to at least 300° C., preferably to 600° C. or upward, as will be obvious from FIG. 2. The heating transforms the mercury in the mercury-containing wastes 1 into a gaseous phase (mostly in the form of atomic mercury). The gasified mercury reacts with the chlorine-containing materials 4, 6 to form, and change into, water-soluble mercuric chloride.

Figure 3:
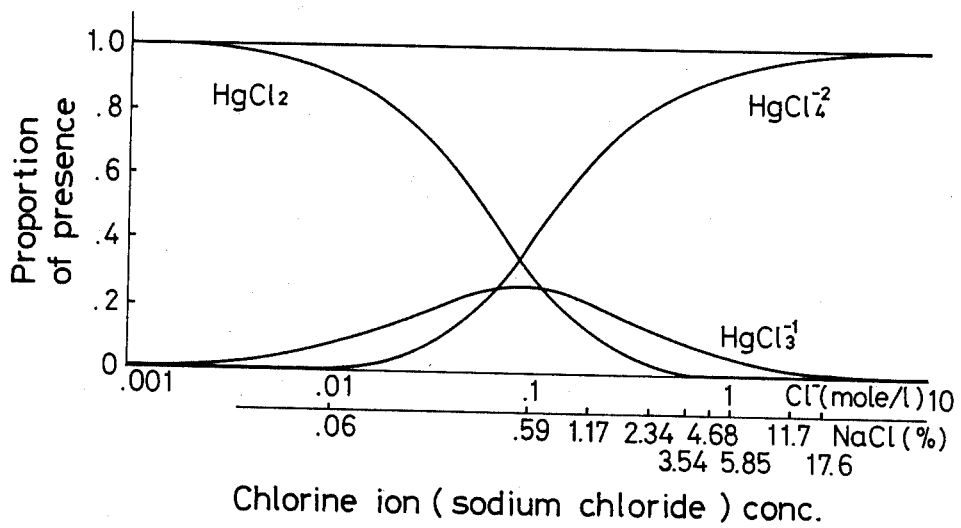
FIG. 3 is a graph showing the proportions of mercuric chloride and chlorocomplex ion present versus the concentration of a saline solution.

The mercuric chloride-containing gaseous emissions 10 that have evolved in the incinerator in the manner described are then freed from soot and heavy metals excepting mercury by a dust collector (not shown) and transferred to a wet scrubber 12. Mercuric chloride in the emissions 10, which is in vapor form and does not stick to soot and other particulates, is not removed by the dust collector. Inside the scrubber 12 mercuric chloride in the gas stream 10 is forced into contact with scrubbing liquid 14 being supplied to the vessel. The liquid 14 may be water but, as will be understood from FIG. 3, a saline solution (aqueous NaCl) at a concentration of at least 0.6% is preferred. Mercuric chloride is converted upon contact with the scrubbing liquid into chlorocomplex ion ($HgCl_4^{-2}$) and fixed in a more stable form in the liquid.

It has been stated above that mercury in the mercury-containing refuse 1 is converted inside the incinerator 2 into water-soluble mercuric chloride ($HgCl_2$) Actually, part of the mercury is likely to remain unaltered in the form of scarcely-water-soluble mercury and atomic mercury. Such mercury cannot be recovered with water, saline solution, or other similar wash water, and there is danger of it being released as it is to the atmosphere. In preferred embodiments of the invention, therefore, the scarcely-water-soluble mercury and atomic mercury are removed with wash water to which urea or a liquid chelate and a metal salt are added beforehand. While there is no limitation to the metal salt, preferred embodiments of the invention favor the use of a copper salt, manganese salt or the like. Preferably, a cuprous salt such as cuprous chloride, a cupric salt such as cupric chloride, or a manganic salt is employed.

Urea or a liquid chelate added to the scrubbing liquid accelerates the insolubilization of chlorocomplex ions and avoids the escape of the ions in gasified form out of the liquid. The additive thus contributes to the stabilization and enhancement of the mercury removal efficiency.

In preferred embodiments of the invention, the amount of the urea or liquid chelate to be added to the scrubbing liquid is at least 10 mg/l, more preferably in the range of 50 to 300 mg/l. Quantitywise, the same is true of the metal salt. The liquid chelate may be any of water-soluble liquid polymers containing a functional group much reactive to mercury, e.g., an amino, thiol, or carboxyl group. For example, "L-1" and "L-2" (trade designations of products by Miyoshi Oil & Fat Co., Ltd.), "ALM 648" (by Nippon Soda Co., Ltd.), and "HM 6000" (by Sumitomo Chemical Co., Ltd.) may be used.

The scrubbing liquid that contains urea or a liquid chelate and a metal salt and is to be brought into contact with the mercury-containing dirty gas, or the mercury-absorbing liquid, could change the properties, above all, of the liquid chelate if it were extremely acidic or alkaline. In case of extreme acidity, the metal salt could be stabilized. Usually, therefore, the pH of the absorbing liquid is adjusted to the range of 2 to 10, preferably to the range of 4 to 9, with an aqueous solution of caustic soda or with an acid solution. Thus, caustic soda is sometimes used to neutralize the treating solution in the scrubber, or at the scrubbing stage, in accordance with the invention. In such case, caustic soda reacts with the chlorine gas contained in the gaseous emissions 10 from the incinerator 2 to form a saline solution. This eliminates or minimizes the necessity of introducing a saline solution into the scrubber to convert mercuric chloride into more stable chlorocomplex ion ($HgCl_4{}^{-2}$).

Although the temperature of the scrubbing liquid is not specifically limited, a temperature low enough to keep the liquid from evaporating down, i.e., a temperature between the room temperature and about 80° C., is preferred.

There is no restriction, either, as to the mode (absorption method) in which the scrubbing liquid comes into contact with the dirty gas or as to the contacting conditions. Varied absorption systems and contacting conditions may be freely chosen depending on the properties and quantity of the gas to be handled. Generally speaking, where the scrubbing liquid and gas stream are brought into contact in a tray tower, the (liquid/gas) ratio ranges from 0.3 to 5 $l/m^3$, in a packed tower from 1 to 10 $l/m^3$, and in a spray tower from 0.1 to 1 $l/m^3$.

Water-soluble mercuric chloride ($HgCl_2$), scarcely-watersoluble mercury, atomic mercury, and other heavy metals not removed by a dust collector, or hydrogen chloride and sulfur oxides, are all absorbed by the scrubbing liquid, which now comes out of the scrubber 12 as waste liquid 20. This waste liquid 20 is led into a general waste liquid treatment unit, e.g., a coagulating sedimentation tank 22, where it is treated in the usual manner and separated into solid matter 24 and cleaned waste liquid 26. Meanwhile, the gas 16 emerging from the scrubber 12 is clean enough to be released to the atmosphere directly or by way of a mist separator (not shown). Under the invention, notably when urea or a liquid chelate and a metal salt are added to the scrubbing liquid, the mercury concentration in the cleaned gas 16 after the mercury removal can be reduced well below a level of 0.05 $mg/m^3$, the permissible concentration in working atmospheres established by the Japanese Government Ordinance on Industrial Safety and Hygiene.

The waste scrubbing liquid 20 that has absorbed mercury and other substances as described above is subjected to ordinary coagulating sedimentation in the coagulating sedimentation tank 22. It is treated with ferric chloride, aluminum sulfate or the like as coagulant, so that mercury is fixed and insolubilized in the resulting sludge. Consequently, the waste liquid 26 after the solid-liquid separation in the coagulation tank 20 contains mercury in an amount far below the emission standard (0.005 mg/l).

Under the invention, the waste liquid 26 has such a low COD and provides water with such good quality that it can be immediately drained into a river or the like.

When the process of the invention is put into practice the resulting sludge 24 will have a mercury content of 3,000 to 8,000 mg/kg as compared with the 1,000 to 3,000 mg/kg according to the conventional sodium sulfide process. This indicates the by far superior efficiency of mercury recovery the invention gives. Also, as can be seen from Table 1, the COD of the final waste wash liquid 26 in the practice of the invention is 20 mg/l when 100 mg/l of a liquid chelate plus a metal salt are added (or even only 1 mg/l when urea is used instead). It will be appreciated that these values are by far the smaller than when the conventional absorbent thiourea is used. The waste liquid with such a low COD level can be directly discharged into a river or the like without any aftertreatment.

On the other hand, the sludge formed by solid-liquid separation in the coagulating sedimentation tank 22 is further divided by a dewatering unit into liquid and solid phases. The liquid matter is directly discharged into a river or the like in the usual manner or is transferred to a station for a higher degree of treatment with active charcoal and chelate resin. The solid matter can be used in landfill because mercury in the sludge is stable and insolubilized. For the sake of used resource reclamation, it is preferably transported to a mercury recovery unit (not shown), where mercury is recovered.

TABLE 1

|  | Absorbent quantity, mg/l | | Hg conc., $mg/Nm^3$ | | Hg removal | COD, |
|---|---|---|---|---|---|---|
|  | Chemical | Metal | Inlet | Outlet | rate, % | mg/l |
| Example | | | | | | |
| 1 | Pure water | | 0.45 | 0.07 | 84.4 | |
| 2 | Saline soln | (10% NaCl) | 0.45 | 0.05 | 88.9 | |
| 3 | Saline soln | (10% NaCl) | 0.23 | 0.02 | 91.3 | |
| 4 | Chelate 100 | — | 0.38 | 0.015 | 96.1 | |
| 5 | Urea 100 | Cu(I) 300 | 0.38 | 0.008 | 97.9 | 1.0 |
| 6 | Urea 300 | Cu(II) 100 | 1.3 | 0.032 | 97.5 | — |
| 7 | Urea 300 | Mn(II) 100 | 0.76 | 0.020 | 97.4 | — |
| 8 | Urea 100 | Mn(II) 300 | 0.15 | 0.005 | 96.7 | <1 |
| 9 | Urea 100 | Cu(II) 300 | 0.20 | 0.005 | 97.5 | <1 |
| 10 | Chelate 100 | Cu(I) 300 | 0.19 | 0.012 | 93.7 | 20 |
| 11 | Urea 100 | Cu(I) 10 | 0.38 | 0.019 | 95.0 | |
| Comparative | | | | | | |
| 1 | Thiourea 1000 | Cu(I) 300 | 0.20 | 0.0014 | 99.3 | 206 |
| 2 | Pure water | | 0.295 | 0.295 | 0 | |

TABLE 1-continued

| | Absorbent quantity, mg/l | | Hg conc., mg/Nm³ | | Hg removal rate, % | COD, mg/l |
| --- | --- | --- | --- | --- | --- | --- |
| | Chemical | Metal | Inlet | Outlet | | |
| 3 | Saline soln | (10% NaCl) | 0.30 | 0.30 | 0 | |

Notes:
Heating furnace temperature = 900° C.
HCl conc. = 1500 ppm (No HCl added in Comparative Examples 2 and 3.)

TABLE 2

| | Absorbent compn, mg/l | | Coagulant, mg/l | | | | Hg in raw water, mg/l | Hg in treated water, mg/l | COD of raw water, mg/l |
| --- | --- | --- | --- | --- | --- | --- | --- | --- | --- |
| Example | Chemical | Metal | Chelate | FeCl₃ | Polymer coaglt | pH | | | |
| 12 | Urea 100 | Cu(II) 300 | 2 | 300 | 6 | 8 | 0.088 | 0.0017 | <1 |
| 13 | Urea 100 | Cu(II) 300 | 10 | 300 | 6 | 8 | 0.088 | 0.0011 | <1 |
| 14 | Urea 100 | Mn(II) 300 | 1200 | 500 | 5 | 7 | 0.068 | <0.0005 | <1 |
| 15 | Chelate 100 | Cu(I) 300 | 0 | 300 | 6 | 8 | 0.044 | 0.0005 | 20 |

EXAMPLES

Figure 1:
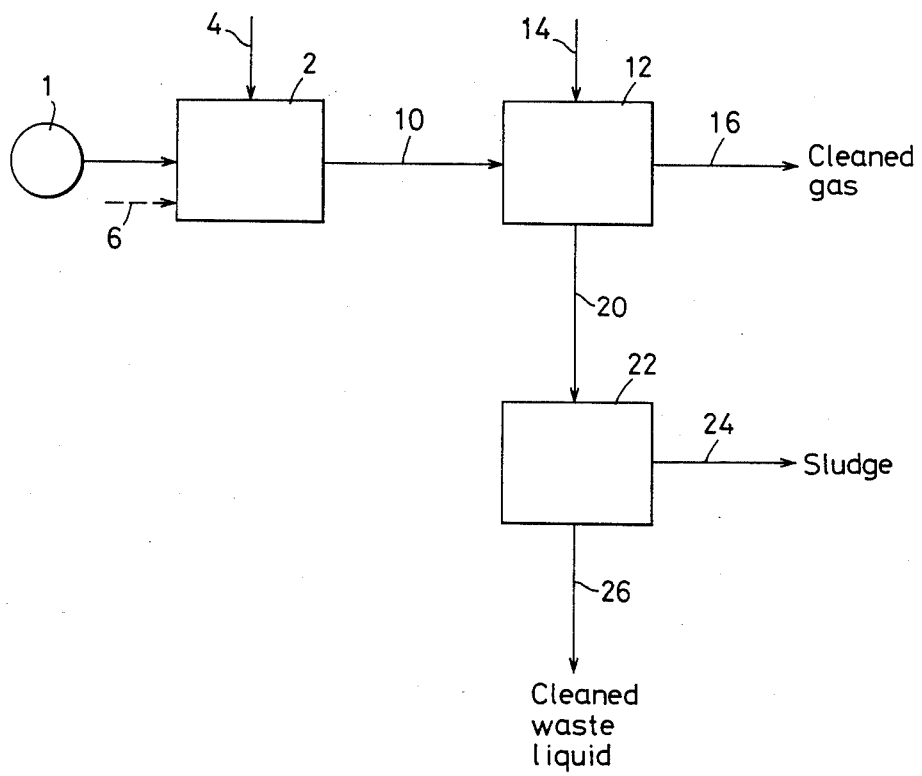
FIG. 1 is a flowsheet of process steps for the cleaning of mercury-containing gaseous emissions in one embodiment of the invention.
Figure 4:
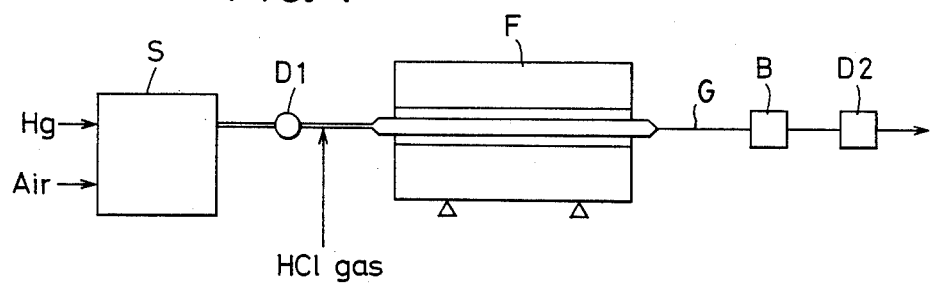
FIG. 4 is a schematic view of a testing apparatus for the process of the invention.

Examples of the present invention will now be explained. Various experiments on the invention were made with a testing apparatus schematically shown in FIG. 4. The apparatus may be briefly outlined as follows. Mercury vapor (atomic mercury) supplied by a mercury producer (not shown) was diluted with air to prepare standard mercury gas S. Following the determination of its concentration by an inlet mercury concentration detector means D1, the standard mercury gas S was mixed with hydrogen chloride gas. The mixture was then introduced into a heating furnace F.

Gaseous emission G from the heating furnace F was collected by an absorption bottle B, and the concentration of mercury in the gas stream emerging from the bottle B was determined by an outlet mercury concentration detector means D2.

The hydrogen chloride concentration was confined within the range of 500 to 1,500 ppm, and the temperature of the heating furnace varied stepwise to 70°, 300°, 600°, and 900° C.

EXAMPLES 1-10

Gas supply to absorption bottles B varied from 0.5 to 1.0 l/min. Each absorption bottle contained 100 ml of one of varied scrubbing liquids. Duration of contact between the gas and each liquid was 15 to 30 min. During the absorptive contact, the scrubbing liquid temperature was in the range of 30° to 70° C.

As metal salts, cuprous chloride (Cu(I)), cupric chloride (Cu(II)), and manganese chloride (Mn(II)) were used. The experimental results were as summarized in Table 1.

From the results in Table 1 it is manifest that, in accordance with the process of the invention, mercury can be removed at very high rates. The table shows that favorable mercury removal rates were achieved by means of a scrubbing liquid consisting of a saline solution (Examples 2 and 3) and that adequately high rates are also attained by the use, as the scrubbing liquid, of a liquid chelate alone (Example 4), a combination of a liquid chelate and a metal salt (Example 10), or urea in place of the liquid chelate (Examples 5-9).

Further, pure water as the scrubbing liquid (Example 1) was found to be useful for the practical purpose, although the mercury removal rate was lower than the rates attained in other Examples.

EXAMPLE 11

This Example used the same procedure and conditions as used in Example 5 with the exception that the concentration of the metal salt in the scrubbing liquid was lower than in Example 5. Table 1 shows that the mercury removal rate becomes lower in proportion to the decrease in concentration of the metal salt in the urea-metal salt combination.

EXAMPLES 12-15

Next, in order to inspect the state of coagulating sedimentation of the waste liquids that absorbed mercury in absorption bottles, a liquid chelate, ferric chloride (FeCl₃) as a coagulant, and a polymeric coagulant were added to the waste liquids obtained in Examples 8 and 9. Also, ferric chloride (FeCl₃) as a coagulant and a polymeric coagulant were added to the waste liquid produced in Example 10. The results are given in Table 2. It is clear from the results of Table 2 that all the mercury concentrations in the treated waste liquids after the coagulating sedimentation amply satisfy the effluent standard value for mercury (0.005 mg/l) provided for in the related law.

COMPARATIVE EXAMPLES 1-3

The procedure of Examples of the invention was repeated under the same conditions except that the composition of the scrubbing liquid was varied otherwise. In Comparative Example 1, thiourea and a metal salt were added to the scrubbing liquid Comparative Examples 2 and 3 did not add hydrogen chloride to gaseous mercury.

Even a scrubbing liquid consisting of thiourea and a metal salt can give a very high rate of mercury removal (Comparative Example 1). However, this is not practical in that an extremely large quantity of thioureais required to attain the end, with consequent increases in the volume of sludge and in the COD value.

Where mercuric chloride was not formed (Comparative Examples 2 and 3), mercury was not in the least removed.

Advantageous Effects of the Invention

According to the present invention, mercury (Hg) in the gaseous phase is first converted to water-soluble mercuric chloride ($HgCl_2$) and thence to chlorocomplex ion ($HgCl_4^{-2}$) stable in liquid. Thus, as is evident from Examples of the invention and Comparative Examples, mercury is most readily absorbed and removed from the gas stream by scrubbing liquid such as a saline solution. The result is a very high rate of mercury removal. In addition, because the invention does not use any strong oxidizing agent, limitations to equipment materials are not many and there is no danger of scatter of strongly acidic mist or other fume.

Moreover, the present invention produces far less sludge than by conventional techniques, with the advantage of easier mercury recovery. The COD of the waste liquid after the coagulating sedimentation is low enough for the liquid to be directly discharged to the sewer without any sophisticated after-treatment. Even if such after-treatment is necessary, the burden of the equipment is considerably reduced, the life of activated charcoal, chelate resin or the like to be used in the sophisticated treatment is extended, and the maintenance cost is accordingly saved to an economical advantage.

The present invention employs urea as an ingredient particularly effective in the scrubbing liquid. The compound is not poisonous or carcinogenic and is easy to handle with a high degree of safety. There is no need of precaution or safeguard means, and hence reduced equipment cost. As a chemical agent, urea is lower priced than thiourea, and in this respect it has a great merit of markedly reducing the running cost of the equipment that embodies the present invention.

The quantity of urea to be consumed is considerably smaller than that of thiourea or the like conventionally used for mercury removal. This accordingly reduces the addition to the overall maintenance cost of the waste gas disposal equipment. Besides this economical advantage, the small urea consumption as noted above offers another advantage of little unfavorable effects upon waste liquid disposal, such as an increase in COD.

Furthermore, the present invention, when applied to a municipal refuse incinerator, can be practiced with existing equipment. The equipment then carries out the steps of heating the charge to form and convert mercury (Hg) in the gaseous phase into water-soluble mercuric chloride ($HgCl_2$), and then transforming the water-soluble mercuric chloride to chlorocomplex ion ($HgCl_4^{-2}$) stable in liquid. The process is also characterized in that, in allowing the scrubbing liquid to absorb mercury, it is not necessary to maintain the liquid within a specific temperature range but the process is most effectively carried on over a broad temperature range from the ordinary temperature to the neighborhood of 80° C.

While the present invention has so far been described as applied to the cleaning of municipal incineator emissions, it is to be understood that the invention, which does not require any extraordinary equipment therefor, is not limited to the embodiments described above but is otherwise embodied in many other applications where mercury is to be removed from gaseous emissions containing the same.

We claim:

1. A process for cleaning gaseous emmissions congaining mercury which are produced by a municipal refuse incinerator comprises the steps of:
   (a) heating mercury-containing waste in a vessel thereby transforming the mercury into a gaseous phase;
   (b) adding a chlorine-containing material to said vessel;
   (c) heating said material with said gaseous phase in said vessel, whereby a water-soluble mercuric chloride ($HgCl_2$) is formed in a vessel effluent;
   (d) scrubbing said vessel effluent having the water-soluble mercuric chloride with a wash water containing a liquid chelate and a metal salt, thereby forming a chlorocomplex ion ($HgCl_4^{-2}$) in said wash water; and
   (e) sedimentation coagulating said wash water containing said chloromcomplex ion, thereby fixing and insolubilizing the mercury in a resulting sludge.

2. A process according to claim 1 wherein the heating step is carried out at 300° C. or upward.

3. A process according to claim 1 wherein the acid gas is selected from the group consisting of hydrogen chloride or chlorine.

4. A process according to claim 1 wherein the heating step is carried out at 600° C. or upward.

5. A process according to claim 1, 2, 3 or 4 wherein the metal salt is a copper salt or manganese salt.

6. A process according to claim 1 wherein the chloride-containing material is selected from the group consisting of chlorine-containing plastics or salt.

* * * * *